United States Patent
Zhang

(10) Patent No.: US 8,453,519 B2
(45) Date of Patent: Jun. 4, 2013

(54) TORQUE TESTING DEVICE

(75) Inventor: Bing-Jun Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 67 days.

(21) Appl. No.: 13/212,196

(22) Filed: Aug. 18, 2011

(65) Prior Publication Data

US 2012/0266693 A1    Oct. 25, 2012

(30) Foreign Application Priority Data

Apr. 20, 2011    (CN) .......................... 2011 1 0099388

(51) Int. Cl.
*G01L 3/02* (2006.01)
*G01L 3/00* (2006.01)

(52) U.S. Cl.
USPC .................................. 73/862.08; 73/862.191

(58) Field of Classification Search
USPC ................... 73/856, 862.08, 862.191
See application file for complete search history.

(56) References Cited

U.S. PATENT DOCUMENTS

| | | | | |
|---|---|---|---|---|
| 5,181,425 A | * | 1/1993 | Livingston | 73/862.08 |
| 5,353,654 A | * | 10/1994 | Lin | 73/865.9 |
| 5,597,964 A | * | 1/1997 | Binns | 73/861.21 |
| 5,703,277 A | * | 12/1997 | Grabovac | 73/1.12 |
| 5,886,246 A | * | 3/1999 | Bareggi et al. | 73/1.09 |
| 6,715,362 B2 | * | 4/2004 | Chiapuzzi et al. | 73/761 |
| 6,718,831 B2 | * | 4/2004 | Chiapuzzi et al. | 73/761 |
| 6,772,645 B2 | * | 8/2004 | Hsien | 73/862.191 |
| 7,252,013 B2 | * | 8/2007 | Hammond et al. | 73/856 |
| 2004/0093959 A1 | * | 5/2004 | Hsien | 73/862.191 |
| 2007/0068277 A1 | * | 3/2007 | Hammond et al. | 73/856 |
| 2008/0223151 A1 | * | 9/2008 | Lai | 73/862.08 |

* cited by examiner

*Primary Examiner* — Lisa Caputo
*Assistant Examiner* — Jonathan Dunlap
(74) *Attorney, Agent, or Firm* — Altis Law Group, Inc.

(57) ABSTRACT

A torque testing device includes a base, a clamping device for clamping a fastener, a holing cylinder mounted on the base, a mounting beam mounted on the holding cylinder, a moving component, a rotation component, and a torque wrench. The mounting beam defines a nesting hole. The moving component includes a tubular member received in the nesting hole and a driving component mounted on the mounting beam for driving the tubular member towards the fastener. The rotation component includes a rotation shaft and at least one rotation element positioned between the rotation shaft and the tubular member. The rotation shaft is moved with the tubular member towards the fastener. The rotation shaft is capable of being rotated about the tubular member through the rotation element. The torque wrench is connected to the rotation shaft for applying torque to the rotation shaft and revealing the value of the torque.

13 Claims, 6 Drawing Sheets

TORQUE TESTING DEVICE

BACKGROUND

1. Technical Field

The present disclosure relates to testing devices and, particularly, to a torque testing device.

2. Description of Related Art

Usually, the proof or yield strength (anti-torque strength) of a screw or a bolt is tested by a torque wrench. During testing, the screw or the bolt is twisted into a threaded hole by the torque wrench. The torque wrench simultaneously provides a lateral force and a torque to the screw or the bolt. However, the screw or the bolt is likely to be tilted by the torque wrench, and torque testing by the torque wrench is not accurate when the screw or the bolt is tilted.

Therefore, it is desirable to provide a torque testing device, which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
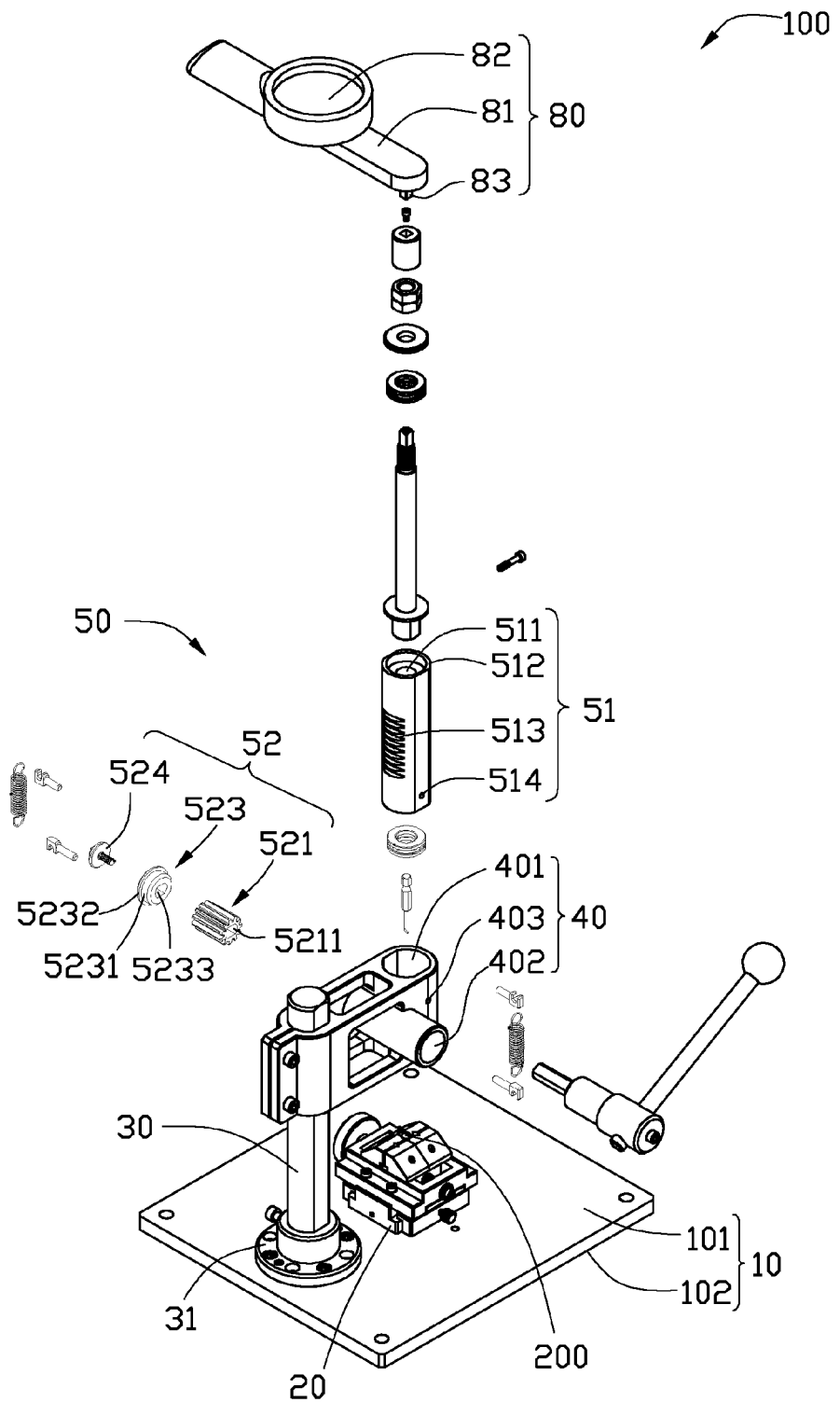
FIG. 1 is an isometric, exploded view of a torque testing device according to an exemplary embodiment.
Figure 2:
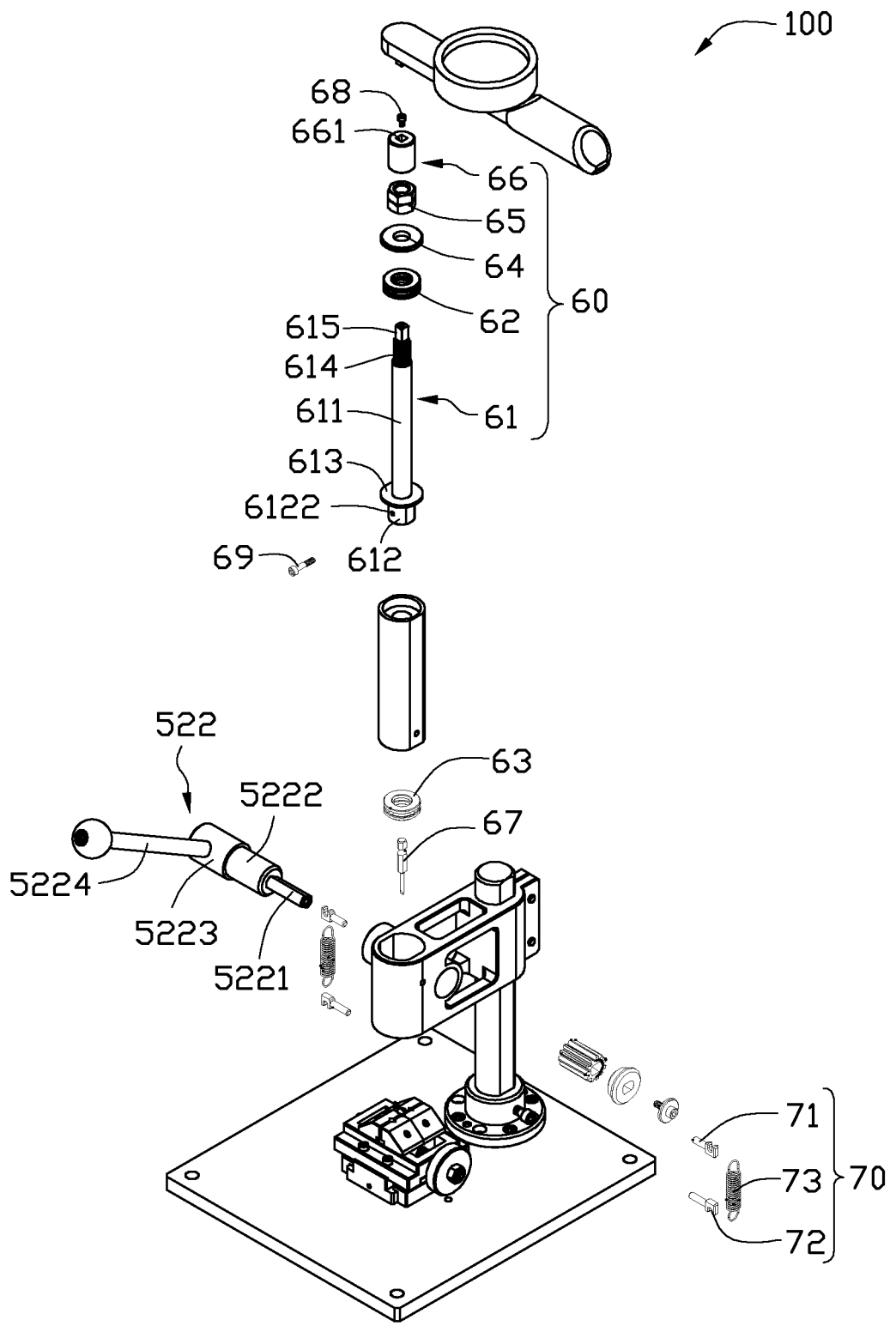
FIG. 2 is similar to FIG. 1, but viewed from another angle.

Referring to FIGS. 1 and 2, a torque testing device 100 for testing or proving the yield strength (anti-torque strength) of a fastener 200, according to an exemplary embodiment, includes a base 10, a clamping device 20, a holding cylinder 30, a mounting beam 40, a moving component 50, a rotation component 60, two reposition components 70, and a torque wrench 80. In this embodiment, the fastener 200 is a screw.

The base 10 is generally a rectangular plate and includes a flat top surface 101 and a bottom surface 102 opposite to the top surface 101.

Figure 3:
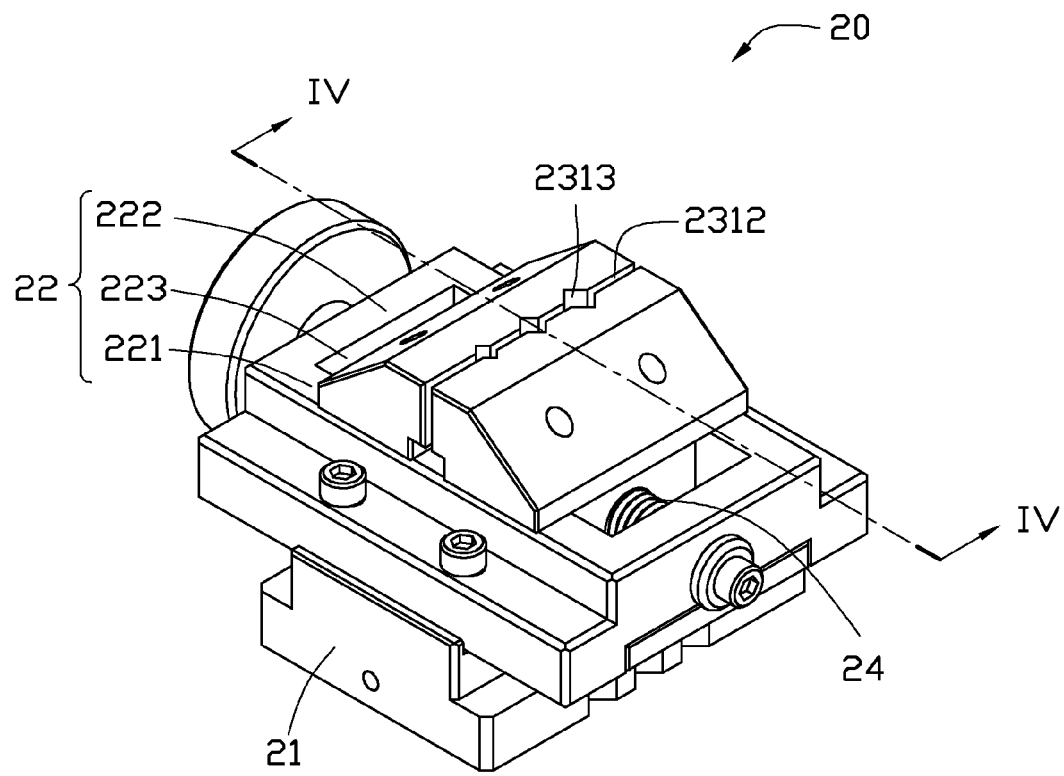
FIG. 3 is an isometric view of a clamping device of the torque testing device of FIG. 2.
Figure 4:
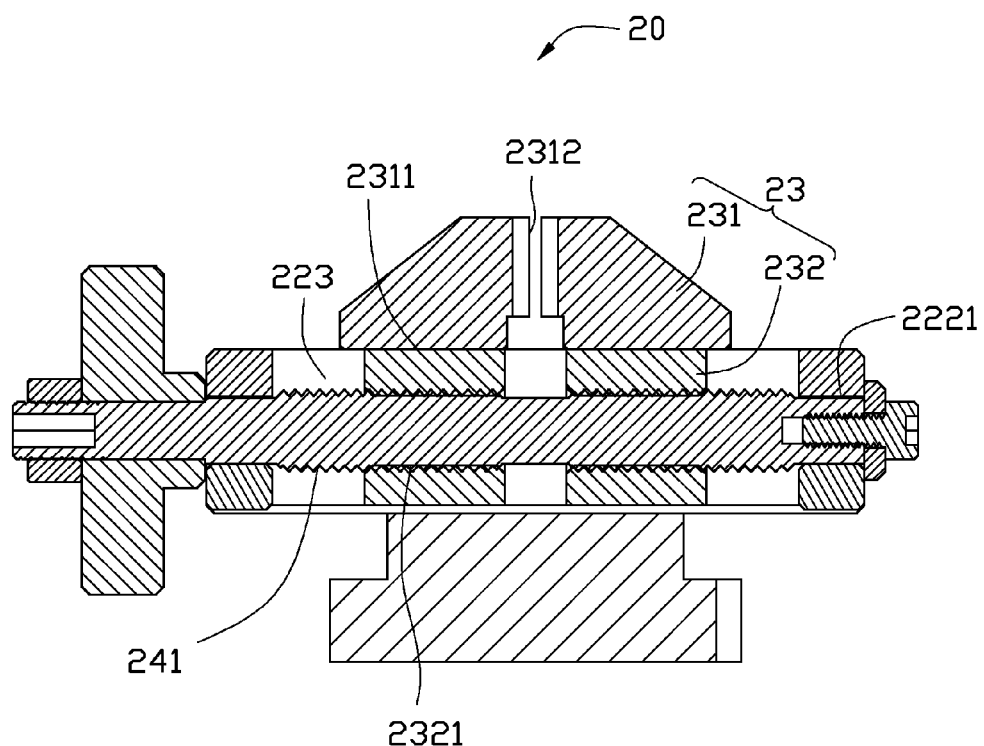
FIG. 4 is a cross-sectional view of the clamping device, taken along line IV-IV of FIG. 3.

Referring to FIGS. 3 and 4, the clamping device 20 includes a supporting base 21, a frame member 22, two slidable members 23 and a bolt 24. The supporting base 21 is positioned on the top surface 101. The frame member 22 is mounted on the supporting base 21 and includes a pair of first sidewalls 221, a pair of second sidewalls 222 substantially perpendicular to the first sidewalls 221, and an opening 223 surrounded by the first sidewalls 221 and the second sidewalls 222. Each second sidewall 222 defines a mounting hole 2221 passing through the corresponding second sidewall 222. Two mounting holes 2221 of the pair of second sidewalls 222 align with each other. Each slidable member 23 includes a clamping portion 231 and a substantially cuboid matching portion 232. Each clamping portion 231 includes a contacting surface 2311 and a clamping surface 2312 substantially perpendicular to the contacting surface 2311. The contacting surface 2311 contacts the pair of the first sidewalls 221. The clamping surface 2312 defines a plurality of V-shaped clamping grooves 2313. Each clamping groove 2313 of one of the clamping portions 2313 corresponds to a clamping groove 2313 of the other clamping portions 2313. Each matching portion 232 is connected to the contacting surface 2311 of a corresponding clamping portion 231. Each matching portion 232 is received in the opening 223. Each matching portion 232 defines a threaded hole 2321. Two threaded holes 2321 of the two matching portions 232 align with each other. The bolt 24 defines exterior threads 241 in the middle portion. The exterior threads 241 engage with the threaded holes 2321. Two ends of the bolt 24 are respectively received in the two mounting holes 2221 and in the manner of a vice the two slidable members 23 can be slid towards each other or slid away from each other when the bolt 24 is rotated.

Referring to FIGS. 1 and 2, the holding cylinder 30 is generally a cylindrical pole, and one end of the holding cylinder 30 is fixed to the base 10 by a flange 31.

The mounting beam 40 is detachably mounted on the holding cylinder 30 away from the base 100. The mounting beam 40 defines a generally circular first nesting hole 401, a circular second nesting hole 402 communicated with the first nesting hole 401 and a pair of first blind holes 403. The first nesting hole 401 is substantially perpendicular to the top surface 101. The second nesting hole 402 is parallel to the top surface 101. The first blind holes 403 are radially defined out of the first nesting hole 401.

The moving component 50 includes a tubular member 51, and a driving component 52. The exterior shape of the tubular member 51 corresponds to the first nesting hole 401. The tubular member 51 is substantially a hollow cylinder and defines a circular through hole 511 and two circular receiving cavities 512. The through hole 511 passes through the tubular member 51 axially. The two receiving cavities 512 are coaxial with the through hole and communicate with the through hole 511. Each of the receiving cavities 512 is located at one side of the through hole 511. The diameter of each receiving cavity 512 is greater than that of the through hole 511. The exterior surface of the tubular member 51 defines a plurality of teeth 513 distributed lengthwise along the tubular member 51 and a pair of radial second blind holes 514 defined out of the tubular member 52.

The driving component 52 includes a gear 521, a driving shaft 522, a limiting member 523, and a fixing screw 524. The gear 521 is squared off at each end and defines an axial rectangular first receiving hole 5211. The driving shaft 522 includes a rectangular engaging portion 5221, a cylinder contact portion 5222 connected to the engaging portion 5221, a cylinder limiting portion 5223 connected to the contact portion 5222, and a handle 5224 connected to the limiting portion 5223 in a substantially perpendicular fashion. The engaging portion 5221 corresponds to the first receiving hole 5211. The diameter of the contact portion 5222 corresponds to the second nesting hole 402. The limiting portion 5223 is coaxial with the contact portion 5222 and the engaging portion 5221. The diameter of the limiting portion 5223 is greater than that of the contact portion 5222. The limiting member 523 includes a cylinder insertion portion 5231 and a circular periphery portion 5232 connected to the insertion portion 5231. The diameter of the insertion portion 5231 corresponds to that of the second nesting hole 402. The insertion portion 5231 defines a second receiving hole 5233 corresponding to the first receiving hole 5211. The diameter of the periphery portion 5232 is greater than that of the insertion portion 5231.

Figure 6:
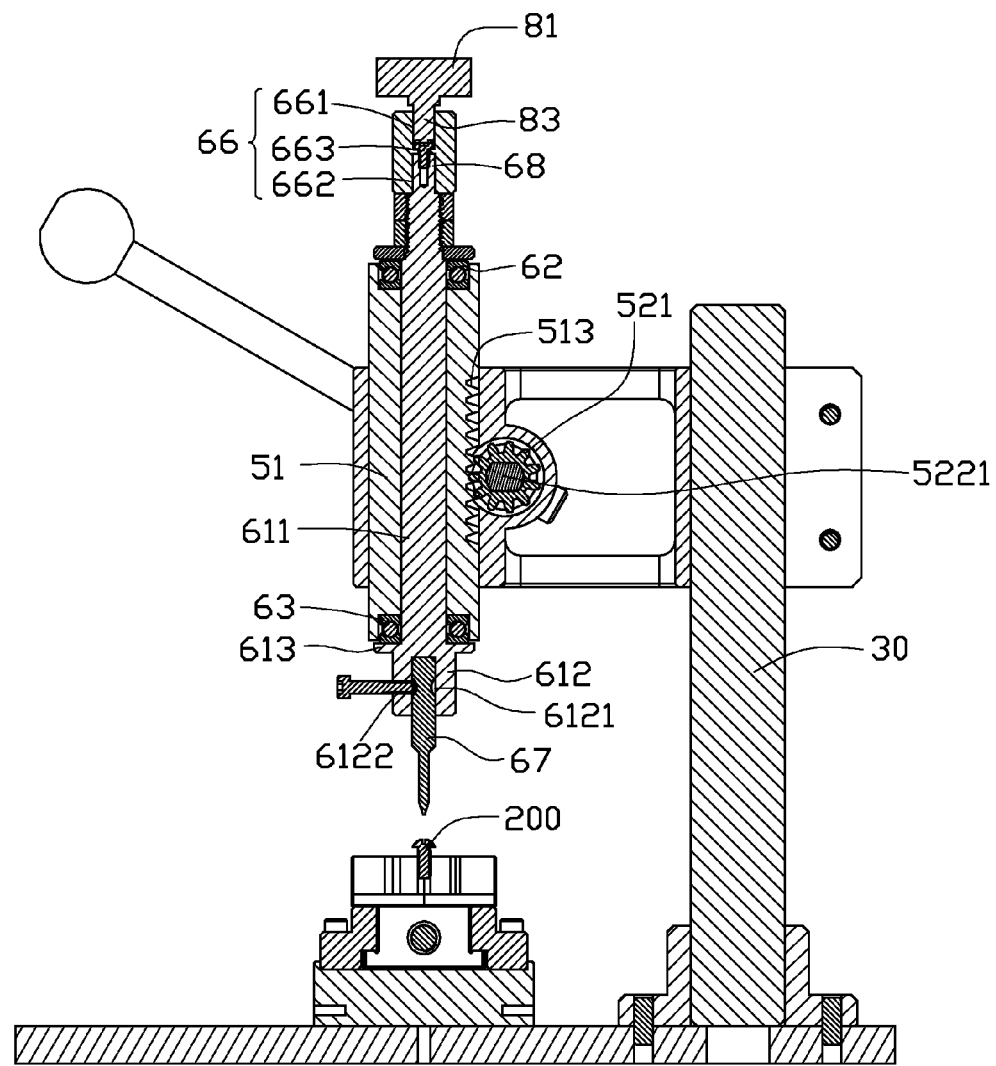
FIG. 6 is a cross-sectional view of the torque testing device, taken along line VI-VI of FIG. 5.

Referring to FIGS. 2 and 6, the rotation component 60 includes a rotation shaft 61, a first rotation element 62, a second rotation element 63, a gasket 64, two nuts 65, a first connection member 66, a second connection member 67, a connection screw 68, and a pushing screw 69. The rotation shaft 61 includes a cylindrical main portion 611, a mounting portion 612, a circular carrying portion 613, a threaded portion 614, and a rectangular connection portion 615. The diameter of the main portion 611 is slightly less than that of the through hole 511. The mounting portion 612 is coaxial with the main portion 611 and connected to one end of the main portion 611. The mounting portion 612 defines a lengthwise mounting groove 6121 and a radial screw hole 6122. The screw hole 6122 communicates with the mounting groove 6121 and is substantially perpendicular to the mounting groove 6121. The carrying portion 613 is coaxially connected between the main portion 611 and the mounting portion 612. The diameter of the carrying portion 613 is greater than that of the main portion 611. The connection portion 615 is adjacent to one end of the main portion 611 and opposite to the mounting portion 612. The threaded portion 614 is connected between the main portion 611 and the connection portion 615. In this embodiment, the first rotation element 62 and the second rotation element 63 are bearings. The nuts 65 engage with the threaded portion 614. The first connection member 66 is cylindrical and includes a pair of end surfaces (not labeled) opposite to each other. The first connection member 66 defines a first rectangular hole 661 adjacent to one of the end surfaces and a second rectangular hole 662 adjacent to the other end surface. The first rectangular hole 661 and the second rectangular hole 662 are separated by a partition plate 663. In this embodiment, the second connection member 67 is a screwdriver.

Each reposition component 70 includes a first hook 71, a second hook 72, and a spring 73.

The torque wrench 80 includes a pole portion 81, a dial scale 82, and a rectangular joint portion 83. The torque wrench 80 further includes a mechanical construction (not shown) in the pole portion 81. The mechanical construction is connected between the dial scale 82 and the joint portion 83. When the joint portion 83 is rotated, the torque is transmitted to and revealed on the dial scale 82.

Referring to FIGS. 1, 2 and 6, when assembling, the holding cylinder 30 is fixed on the base 10, and the mounting beam 40 is mounted to the holding cylinder 30. The tubular member 51 is nested in the first nesting hole 401 with the teeth 513 facing the second nesting hole 402. The gear 521 is received in the second nesting hole 402 and meshes with the teeth 513. The engaging portion 5221 is received in the first receiving hole 5211 from one side of the second nesting hole 402. The contact portion 5222 contacts the interior surface of the second nesting hole 402. The limiting portion 5223 abuts one side of the second nesting hole 402. The limiting member 523 is inserted into the second nesting hole 402 from the other side of the second nesting hole 402 away from the limiting portion 5223. The engaging portion 5221 is further received in the second receiving hole 5233. The periphery portion 5232 abuts the other side of the second nesting hole 402 away from the limiting portion 5223. The limiting member 523 is connected to the engaging portion 5221 by the mounting screw 524 being fixed to the engaging portion 5221. Each first hook 71 is mounted into a corresponding first blind hole 403. Each second hook 72 is mounted into a corresponding second blind hole 514. Each spring 73 connects the first hook 71 and the second hook 72. The first rotation element 62 and the second rotation element 63 are respectively received in the two receiving cavities 512. The rotation shaft 61 is sequentially passed through the second rotation element 63, the through hole 511, the first rotation element 62, and the gasket 64. The second rotation element 63 sits on the carrying member 613. The first rotation element 62 and the second rotation element 63 nest outside the main portion 611. The first rotation element 62 and the second rotation element 63 are positioned between the tubular member 51 and the rotation shaft 61 such that the rotation shaft 61 can be rotated about the tubular member 51. The nuts 65 fasten with the threaded portion 614. The connection portion 615 is inserted into the second rectangle hole 662. The connection screw 68 is inserted into the first rectangular hole 661, passes through the partition plate 663 and is fixed to the connection portion 615 such that the connection portion 615 connects with the first connection member 66. The second connection member 67 is mounted in the mounting groove 6121. The pushing screw 69 is inserted into the screw hole 6122 and presses the second connection member 67. The joint portion 83 is inserted into the first rectangular hole 661 such that the joint portion 83 is connected to the first connection member 66.

Figure 5:
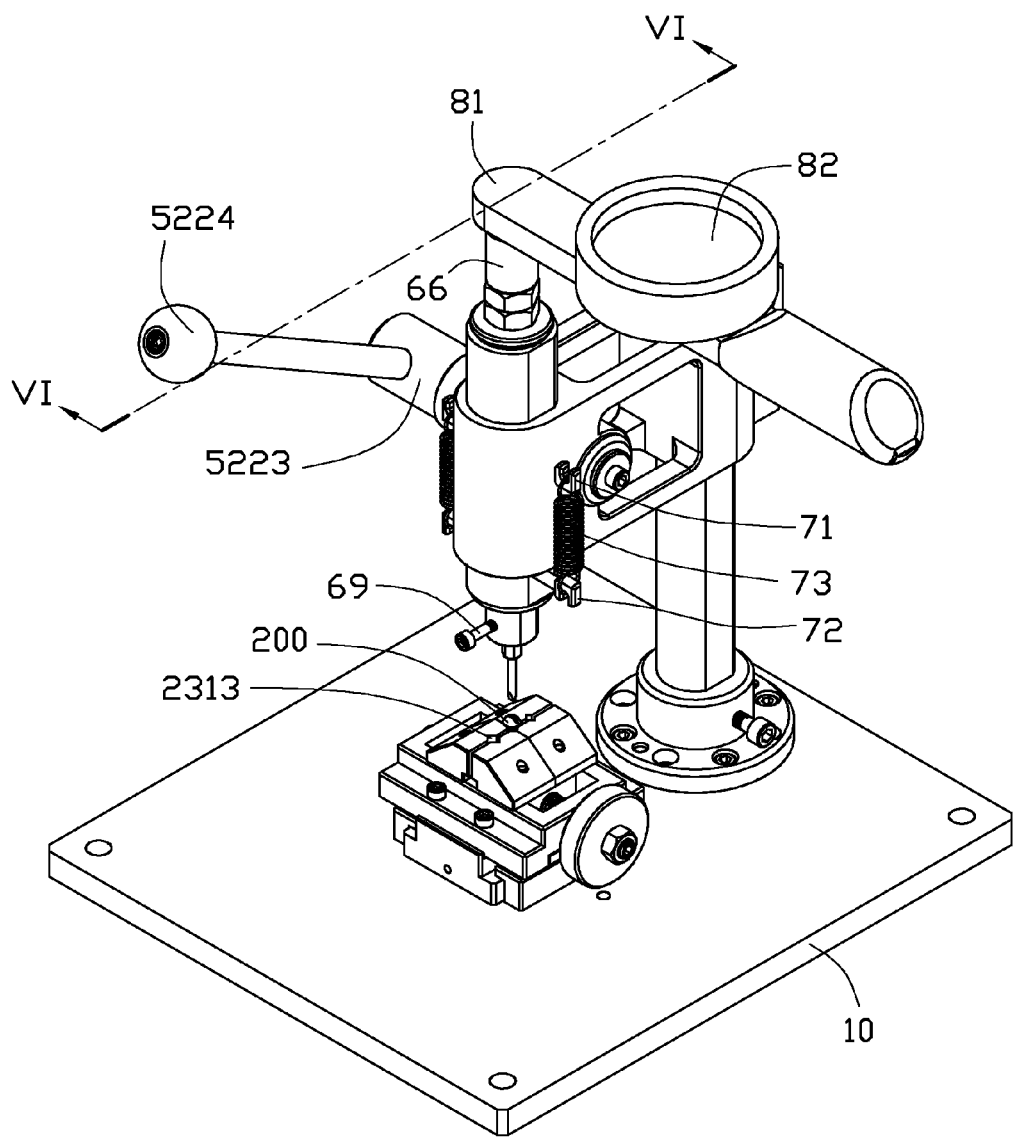
FIG. 5 is an isometric, assembled view of the torque testing device of FIG. 2.

Referring to FIGS. 5 and 6, in use, the fastener 200 is clamped in two corresponding clamping grooves 2313 by the two clamping portions 231. The central axis of the rotation shaft 61 is aligned with the central axis of the fastener 200. The second connection member 67 is aligned with the fastener 200. When the driving shaft 522 is rotated, the tubular member 51 is driven to move towards the fastener 200 along an axial direction of the first nesting hole 401, such that the rotation shaft 61 and the second connection member 67 can reach and engage with the fastener 200. The springs 73 are stretched. A pressing force to the fastener 200 is provided by the second connection member 67. Then when the pole portion 81 is rotated to apply torque to the rotation shaft 61, the torque is transmitted to the fastener 200 by the rotation shaft 61 and the second connection member 67. The dial scale 82 reveals the torque applied. The rotation shaft 61 is capable of being rotated while the second connection member 67 presses on the fastener 200. The friction between the rotation shaft 61 and the tubular member 51 is insignificant and can be ignored relative to the torque applied by the pole portion 81. The torque applied to the fastener 200 is substantially equal to the torque value displayed on the dial scale 82. The springs 73 bring the moving component 50 and the rotation component 60 to its original position when the driving shaft 522 is not being operated.

The pressing force and torque applied to the fastener 200 are respectively provided by the moving component 50 and the torque wrench 80, such that the torque wrench 80 provides only pure angular torque to the fastener 200 without any lateral element or tendency. The resistance of a fastener as tested by this torque wrench is more accurately measured.

In alterative embodiments, the torque testing device 100 can include only one rotation element or include more than two rotation elements.

In alterative embodiments, the fastener 200 can be a bolt of different sizes, the second connection member 67 can correspond to those different sizes of the fastener 200.

The above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A torque testing device, comprising:
   a base comprising a top surface and a bottom surface opposite to the top surface;
   a clamping device mounted on the top surface for clamping a fastener;
   a holding cylinder mounted on the top surface;
   a mounting beam mounted on the holding cylinder and spaced apart from the clamping device, the mounting beam defining a first nesting hole substantially perpendicular to the top surface;
   a moving component comprising a tubular member and a driving component, the tubular member being received in the first nesting hole, the driving component mounted on the mounting beam and configured for driving the tubular member to move along an axial direction of the first nesting hole;
   a rotation component comprising a rotation shaft and at least one rotation element, the rotation shaft being received in the tubular member, the rotation shaft capable of being moved with the tubular member such that one end of the rotation shaft is connected to the fastener, the at least one rotation element being positioned between the rotation shaft and the tubular member, the rotation shaft capable of being rotated about the tubular member through the at least one rotation element; and
   a torque wrench connected to the other end of the rotation shaft, the torque wrench being configured for providing a torque to the rotation shaft and revealing a value of the torque.

2. The torque testing device of claim 1, wherein the tubular member is substantially hollow cylinder and defines a plurality of teeth on an exterior surface thereof, the teeth are arranged lengthwise along the tubular member, the mounting beam further defines a second nesting hole communicated with the first nesting hole, the driving component comprises a gear and a driving shaft, the gear is received in the second nesting hole and meshed with the teeth, the driving shaft is engaged with the gear and configured for driving the gear to rotate.

3. The torque testing device of claim 2, wherein the second nesting hole is substantially perpendicular to the first nesting hole.

4. The torque testing device of claim 1, wherein the rotation component further comprises a first connection member and a second connection member, the first connection member is connected to one end of the rotation shaft, the torque wrench is connected to the rotation shaft through the first connection member, the second connection member is connected to the other end of the rotation shaft and configured to connect the fastener.

5. The torque testing device of claim 4, wherein the tubular member defines a circular through hole and two circular receiving cavities communicated with the through hole, the two receiving cavities are positioned at two opposite ends of the through hole and coaxial with the through hole, the at least one rotation element comprises a first rotation element and a second rotation element, the first rotation element and the second rotation element are respectively received in a corresponding receiving cavity.

6. The torque testing device of claim 5, wherein the first rotation element and the second rotation element are bearings.

7. The torque testing device of claim 5, wherein a diameter of each receiving cavity is greater than that of the through hole.

8. The torque testing device of claim 5, wherein the rotation shaft comprises a cylindrical main portion, a mounting portion, and a circular carrying portion, the carrying portion is coaxially connected between the main portion and the mounting portion, a diameter of the carrying portion is greater than that of the main portion, the main portion is received in the through hole with the first rotation element and the second rotation element sleeved over the main portion and the second rotation element resting on the carrying portion.

9. The torque testing device of claim 8, wherein the mounting portion is coaxial with the main portion and connected to one end of the main portion through the carrying portion, the mounting portion defines a lengthwise mounting groove and a radical screw hole, the screw hole communicates with the mounting groove and substantially perpendicular to the mounting groove, the second connection member is received in the mounting groove, the torque testing device further comprises a pushing screw received in the screw hole and pressing on the second connection member.

10. The torque testing device of claim 9, wherein the rotation shaft further comprises a rectangular connection portion adjacent to the other end of the main portion and opposite to the mounting portion, the first connection member is cylindrical and defines a first rectangular hole and a second rectangular hole, the first rectangular hole and the second rectangular hole are separated by a partition plate, the torque wrench and the connection portion are respectively engaged in the first rectangular hole and the second rectangular hole.

11. The torque testing device of claim 4, wherein the second connection member is a screwdriver.

12. The torque testing device of claim 1, wherein the torque testing device further comprises two reposition components, each reposition component comprises a first hook, a second hook, and a spring, the first hook is mounted on the mounting beam, the second hook is mounted on the tubular member, the spring connects the first hook and the second hook.

13. The torque testing device of claim 1, wherein the clamping device comprises a supporting base, a frame member, two slidable members and a bolt, the supporting base is positioned on the top surface, the frame member is mounted on the supporting base and comprises a pair of first sidewalls and a pair of second sidewalls substantially perpendicular to the first sidewalls, the frame member defines an opening surrounded by the first sidewalls and the second sidewalls, each second sidewall defines a mounting hole, each slidable member comprises a clamping portion and a matching portion, each clamping portion defines a contacting surface and a clamping surface substantially perpendicular to the contacting surface, the clamping surface defines a plurality of clamping grooves, each clamping groove of one of the clamping portions corresponds to a clamping groove of the other clamping portion, each matching portion is connected to a corresponding contacting surface, each matching portion is received in the opening and defines a threaded hole, the two threaded holes of the two matching portion align with each other, the bolt is cylindrical and defines exterior threads, the bolt passes through the two threaded holes with the exterior threads engaging with the threads holes, two ends of the bolt are respectively received in the two mounting holes, the two slidable members are capable of sliding towards each other or sliding away from each other when the bolt is rotated.

* * * * *